(12) United States Patent
Wang et al.

(10) Patent No.: US 11,874,197 B2
(45) Date of Patent: Jan. 16, 2024

(54) COUPLING DESIGN FOR FLESH MEMBERS OF ANTHROPOMORPHIC TEST DEVICE

(71) Applicant: Humanetics Innovative Solutions, Inc., Farmington Hills, MI (US)

(72) Inventors: Zhenwen J. Wang, Farmington Hills, MI (US); Thanh Nghi, Ann Arbor, MI (US); Joseph P. McInnis, New Hudson, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 502 days.

(21) Appl. No.: 17/277,761

(22) PCT Filed: Sep. 23, 2019

(86) PCT No.: PCT/US2019/052473
§ 371 (c)(1),
(2) Date: Mar. 19, 2021

(87) PCT Pub. No.: WO2020/061575
PCT Pub. Date: Mar. 26, 2020

(65) Prior Publication Data
US 2022/0120637 A1      Apr. 21, 2022

Related U.S. Application Data

(60) Provisional application No. 62/734,412, filed on Sep. 21, 2018.

(51) Int. Cl.
| G09B 23/34 | (2006.01) |
| G01M 17/007 | (2006.01) |
| G09B 23/32 | (2006.01) |

(52) U.S. Cl.
CPC ......... *G01M 17/0078* (2013.01); *G09B 23/32* (2013.01); *G09B 23/34* (2013.01)

(58) Field of Classification Search
CPC ... G01M 17/0078; G09B 23/32; G09B 23/34; G09B 23/30
See application file for complete search history.

(56) References Cited

U.S. PATENT DOCUMENTS

| 4,261,113 A | 4/1981 | Alderson |
| 5,423,685 A | 6/1995 | Adamson et al. |

(Continued)

FOREIGN PATENT DOCUMENTS

| DE | 102015213589 A1 | 1/2017 |
| EP | 2305078 A1 | 4/2011 |

(Continued)

OTHER PUBLICATIONS

Chinese Search Report for Application CN 2019800676960 dated Nov. 3, 2022, 3 pages.

(Continued)

*Primary Examiner* — David J Bolduc
(74) *Attorney, Agent, or Firm* — Howard & Howard Attorneys PLLC

(57) ABSTRACT

A coupling design for an anthropomorphic test device includes mounting a base member to an anatomical component. The base member has opposing inner and outer surfaces and a peripheral edge connecting the base inner and outer surfaces with the base inner surface defining a first cavity. At least one base connector is coupled to the base inner surface and is at least partially disposed within the first cavity. The anatomical component has opposing inner and outer surfaces and a peripheral edge connecting the component inner and outer surfaces with the component inner surface defining a second cavity. At least one component connector is coupled to the anatomical component. The mounting is such that the component connector engages the base connector and the component and base peripheral edges abut and wherein the base and component outer surfaces (Continued)

align to define a smooth transition between the base and component outer surfaces.

19 Claims, 8 Drawing Sheets

(56) References Cited

U.S. PATENT DOCUMENTS

| | | | |
|---|---|---|---|
| 5,589,651 | A | 12/1996 | Viano et al. |
| 5,741,989 | A | 4/1998 | Viano et al. |
| 6,310,619 | B1 | 10/2001 | Rice |
| 6,409,516 | B1 * | 6/2002 | Thill .................... G09B 23/30 434/274 |
| 9,799,234 | B2 * | 10/2017 | Been .................... G09B 23/32 |
| 9,889,024 | B2 | 2/2018 | Sawatzki et al. |
| 10,820,933 | B1 * | 11/2020 | Murdoch ............ G09B 23/285 |
| 2007/0212672 | A1 * | 9/2007 | McAllister ............ G09B 23/30 434/274 |
| 2008/0227073 | A1 * | 9/2008 | Bardsley ............... G09B 23/34 434/267 |
| 2014/0294485 | A1 | 10/2014 | McInnis et al. |
| 2015/0086957 | A1 | 3/2015 | Gibbs et al. |
| 2016/0078784 | A1 | 3/2016 | Sullenberger et al. |
| 2016/0140879 | A1 | 5/2016 | Hananel et al. |
| 2016/0189571 | A1 | 6/2016 | Wang |
| 2017/0162077 | A1 | 6/2017 | Vara et al. |
| 2018/0136083 | A1 | 5/2018 | Wang et al. |
| 2019/0180648 | A1 | 6/2019 | Tedeschi et al. |
| 2021/0048373 | A1 * | 2/2021 | Wang .................... G09B 23/00 |
| 2021/0217328 | A1 * | 7/2021 | Been .................... G09B 23/32 |
| 2021/0350726 | A1 * | 11/2021 | Wang .................... G09B 23/32 |

FOREIGN PATENT DOCUMENTS

| | | |
|---|---|---|
| EP | 3273430 A1 | 1/2018 |
| EP | 3273431 A1 | 1/2018 |
| GB | 2244843 A | 12/1991 |
| GB | 2405713 A | 3/2005 |
| JP | 2015099136 A | 5/2015 |
| JP | 2015099137 A | 5/2015 |
| WO | 2018035550 A1 | 3/2018 |

OTHER PUBLICATIONS

Supplementary European Search Report for Application EP 19 86 2727 dated Apr. 21, 2022, 2 pages.
International Search Report for Application No. PCT/US2019/052473 dated Dec. 13, 2019, 1 page.
Computer-generated English language abstract for DE 10 2015 213 589 A1 extracted from espacenet.com database on Apr. 13, 2022, 4 pages.
English language abstract for JP 2015-099136 A extracted from espacenet.com database on Apr. 13, 2022, 1 page.
English language abstract for JP 2015-099137 A extracted from espacenet.com database on Apr. 13, 2022, 1 page.

* cited by examiner

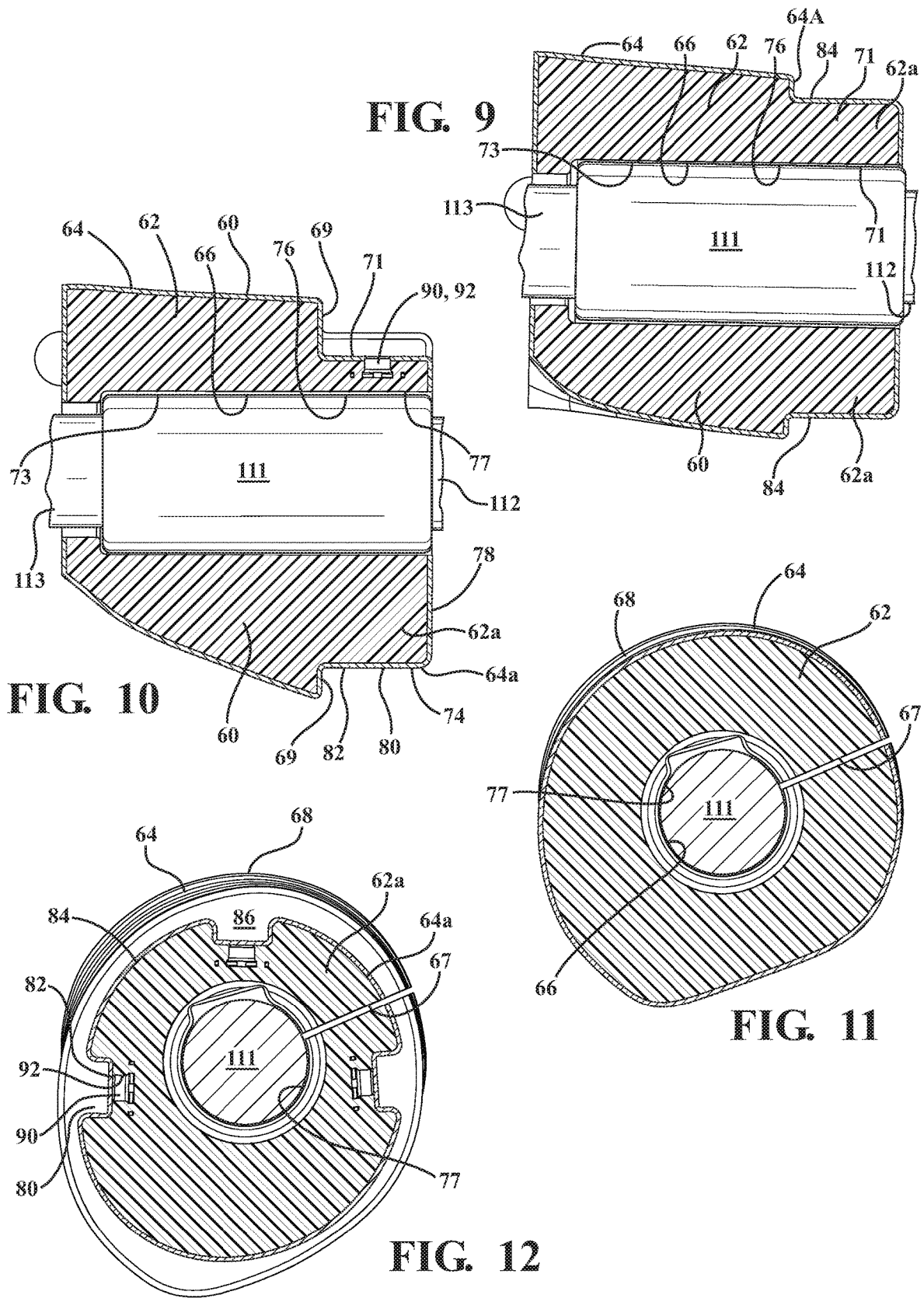

COUPLING DESIGN FOR FLESH MEMBERS OF ANTHROPOMORPHIC TEST DEVICE

CROSS-REFERENCE TO RELATED APPLICATIONS

The present disclosure is the National Stage of International Patent Application PCT/US19/52473, filed on Sep. 23, 2019, which claims priority from U.S. Provisional App. Ser. No. 62/734,412, filed Sep. 21, 2018 and entitled "Coupling Design for Thigh Flesh of Anthropomorphic Test Device", the entirety of which is herein incorporated by reference.

BACKGROUND OF THE INVENTION

1. Field of the Invention

The present invention relates generally to anthropomorphic test devices and, more particularly, to a coupling design for flesh members of an anthropomorphic test device, such as for coupling thigh flesh of an anthropomorphic test device.

2. Description of the Related Art

Automotive, aviation, and other vehicle manufacturers conduct a wide variety of collision testing to measure the effects of a collision on a vehicle and its occupants. Through collision testing, sometimes otherwise referred to as crash testing, a vehicle manufacturer gains valuable information that can be used to improve the vehicle.

Collision testing often involves the use of anthropomorphic test device, sometimes alternatively referred to as anthropomorphic mannequins, and better known as "crash test dummies", to estimate a human's injury risk. The crash test dummy typically includes a head assembly, spine assembly, rib cage assembly, pelvis assembly, right and left arm assemblies, and right and left leg assemblies. Joints are provided to couple various assemblies together and to allow articulation that simulates the human range of motion. In addition, these assemblies are typically covered with a simulated flesh that includes an inner foam material covered with a skin. The anthropomorphic test device must possess the general mechanical properties, masses, joints, and joint stiffness of the humans of interest. In addition, the anthropomorphic test device must possess sufficient mechanical impact response to cause them to interact with the vehicle's interior in a human-like manner during the collision testing.

Often in these devices, the flesh is split at the joint, or at a convenient location, to facilitate the assembly/disassembly and handling. However, while the split of the flesh facilitates assembly and handling, it created an unhuman-like response during collision testing. For example, in certain designs of leg assemblies, the upper thigh member and the lower thigh member of the leg assembly of the device are connected through a joint and include the thigh flesh that is segmented at a position corresponding to this joint. During a collision test, a large offset, or separation, may be created in the thigh flesh corresponding to the joint, resulting in improper flesh/mass coupling between the upper and lower thigh members and resulting in a discontinuous surface along the skin of the thigh flesh. This improper coupling and discontinuous surface may influence the dynamics of the leg and pelvis and contribute to the unhuman like responses of the crash test dummy during this collision test.

The present invention addresses and overcomes the separation issues associated with the prior art designs and provides therefore a crash test dummy having a more human-like response during collision testing.

SUMMARY OF THE INVENTION

The present invention relates to a coupling design for flesh members of an anthropomorphic test device, and more in particular to a flesh coupling design for an anthropomorphic test device formed by coupling a base member to an anatomical component.

The base member has a base inner surface and an opposing base outer surface and a base peripheral edge connecting the base inner surface to the base outer surface, with the base inner surface defining a first cavity. At least one base connector is coupled to the base inner surface and is at least partially disposed within the first cavity. The anatomical component has a component inner surface and an opposing component outer surface and a component peripheral edge connecting the component inner surface to the component outer surface, with the component inner surface defining a second cavity. At least one component connector is coupled to the anatomical component.

When the base member is mounted to the anatomical component, the component connector engages the base connector and the component peripheral edge abuts the base peripheral edge with the base and component outer surfaces aligning to define a smooth transition between the base outer surface and the component outer surface. In certain embodiments, at least one fastener is used to secure the base member to the component connector.

In more specific aspects, structural components are included in the anthropomorphic test device and contained within each of the first and second cavities, and these structural components are coupled together when the base member is mounted to the anatomical component as described above.

In further aspects, the at least one base connector is a locating key that is coupled to the base inner surface, and the component connector includes corresponding slots that are coupled with the respective locating keys when the base member is mounted to the anatomical component.

In more specific aspects of the disclosure, the base member and anatomical component are the components that couple together the thigh flesh in the anthropomorphic test device, and thus the base member is either an upper thigh member or a lower thigh member, while the anatomical component is the other one of the upper thigh member or the lower thigh member.

Other features and advantages of the present disclosure will be readily appreciated, as the same becomes better understood, after reading the subsequent description taken in conjunction with the accompanying drawings.

BRIEF DESCRIPTION OF THE DRAWINGS

FIG. 9 is a section view of FIG. 5 taken along line 9-9.

FIG. 10 is another section view of FIG. 5 taken along line 10-10.

FIG. 11 is another section view of FIG. 5 taken along line 11-11.

FIG. 12 is another section view of FIG. 5 taken along line 12-12.

DESCRIPTION OF THE PREFERRED EMBODIMENT(S)

The embodiments of the present disclosure disclose an anthropomorphic test device, or crash test dummy 10, and more particularly to a portion of a crash test dummy, that is used primarily to test the performance of automotive interiors and restraint systems for adult front and rear seat occupants. The size and weight of the crash test dummy 10 of the embodiments described herein are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. The crash test dummy 10 is of a fiftieth percentile (50%) male type and is illustrated in FIG. 1 in a sitting position positioned on a car seat 25.

Figure 1:
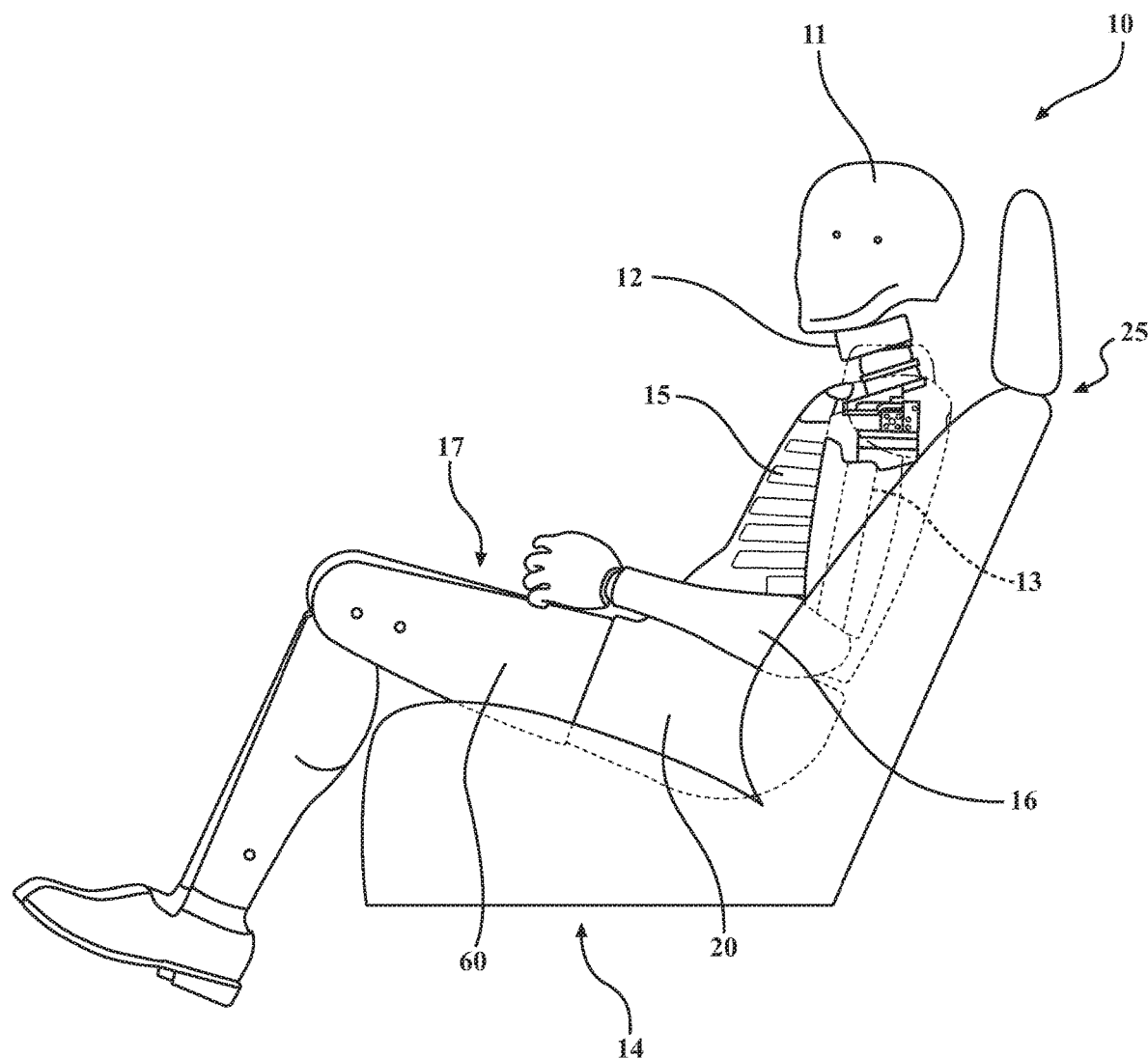
FIG. 1 is a perspective view of one embodiment of a crash test dummy positioned on a car seat in accordance with the present disclosure.

As illustrated in FIG. 1, the crash test dummy 10 includes a head assembly, generally indicated at 11. The crash test dummy 10 also includes a neck assembly 12 mounted to and extending from the head assembly 11. The crash test dummy 10 also includes a spine assembly, generally indicated at 13, having an upper end mounted to the neck assembly 12 and a lower end extending into a torso area of the crash test dummy 10. The crash test dummy 10 further includes a pelvis assembly 14 coupled to the lower end of the spine assembly 13. The torso area of the crash test dummy 10 also includes a rib cage assembly, generally indicated at 15, connected to the spine assembly 13. The crash test dummy 10 also has a pair of arm assemblies including a left arm assembly, generally indicated at 16, and a right arm assembly (not shown), which are attached to the crash test dummy 10. The crash test dummy 12 further includes a pair of leg assemblies, generally indicated at 17 including a left leg assembly and a right leg assembly, which are attached to the pelvis assembly 14. It should be appreciated that various components of the crash test dummy 10 are covered in a flesh and skin assembly, shown in the embodiments below as an inner core foam 22 covered with a skin 24, for improved coupling with the skeleton of the crash test dummy 10.

The present disclosure is directed to a coupling design for coupling together flesh members used to form a portion of the crash test dummy 10 as described above. The flesh members can be further defined as a base member 20 and an anatomical component 60. While the base member 20 and anatomical component 60 can refer to any two flesh members used for forming a portion of a crash test dummy 10, the embodiments of the coupling design, as described and illustrated herein, including the base member 20 and anatomical component 60 as described herein are flesh members used to form the thigh member of the crash test dummy 10, which defines a portion of the leg assembly 17, which generally corresponds the thigh portion of a human.

Figure 2:
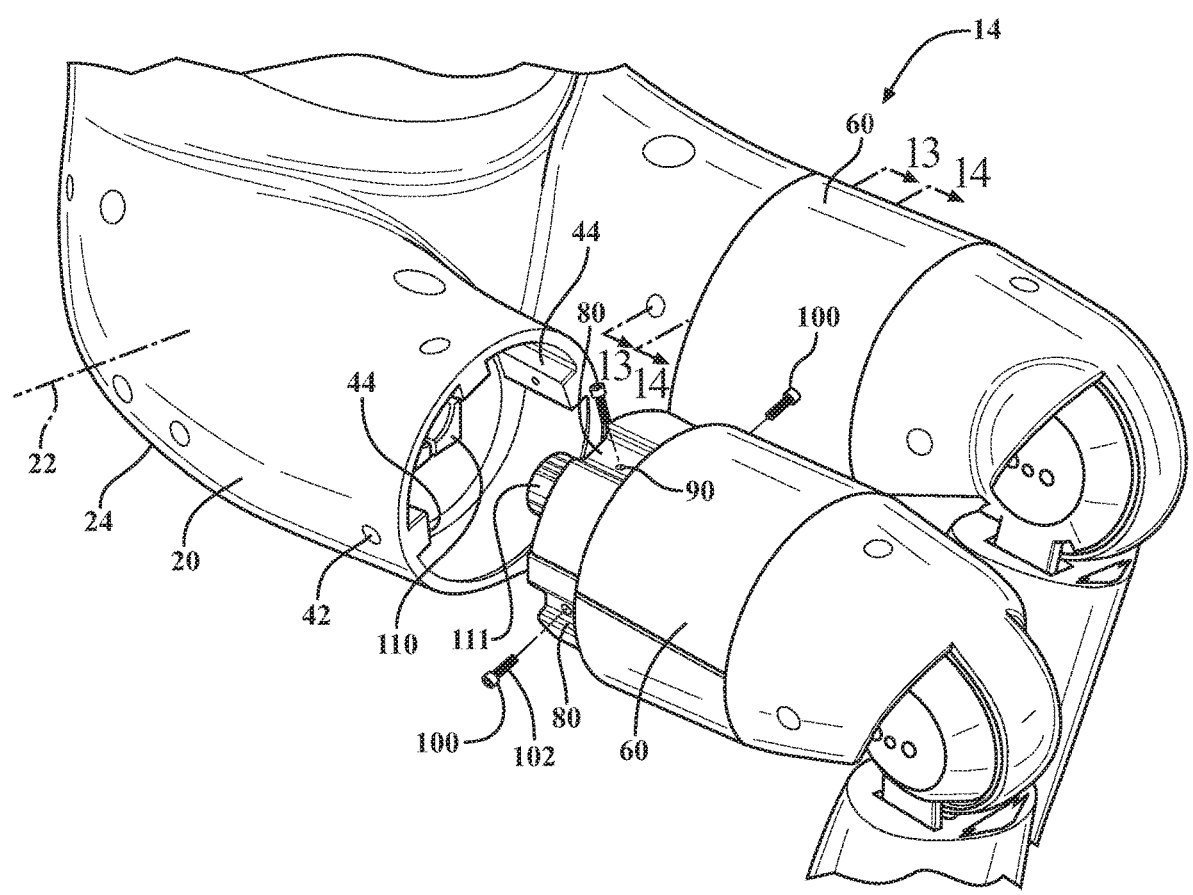
FIG. 2 is a perspective view of one embodiment of a portion of a crash test dummy of FIG. 1 in accordance with the present disclosure including a base member and a pair of anatomical components, in which one of the anatomical components is shown coupled to base member and in which the other one of the anatomical components is shown uncoupled from the base member.

In the embodiments described below and illustrated in FIGS. 2-14, the base member 20 refers to an upper thigh member 20, and the anatomical component 60 refers one or both of a pair of lower thigh members 60, with one of the pair of lower thigh members corresponding to lower thigh portion of the right leg of the leg assembly 17 of crash test dummy 10 and the other one of the pair of lower thigh members corresponding to the left leg of the leg assembly of the crash test dummy 10. As illustrated in FIGS. 2 and 4, the upper thigh member 20 is shown as a continuous structure with the flesh portion of the pelvis assembly 14 and is considered therefore as a part of the pelvis assembly 14, while in other embodiments the flesh portions could be separated but coupled structures.

Figure 3:
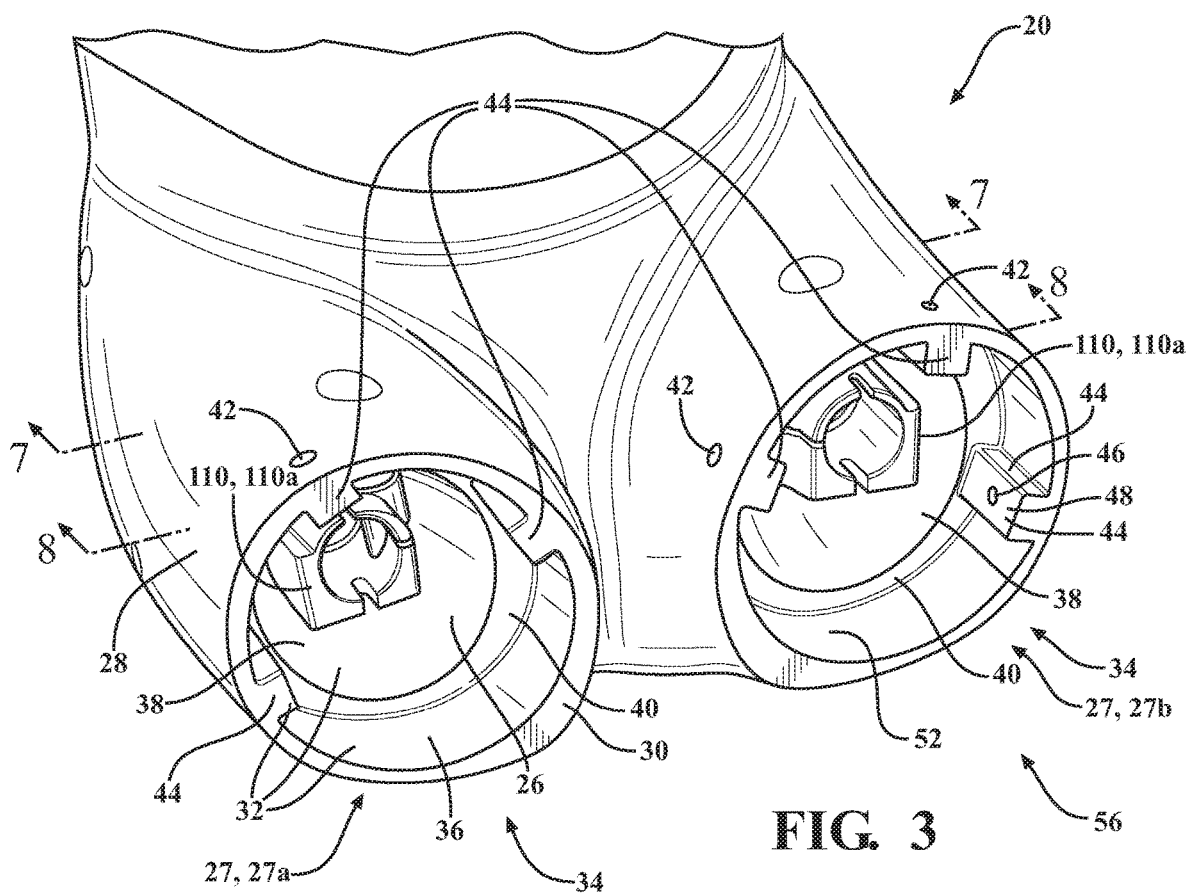
FIG. 3 is a perspective view of the base member of FIG. 2.
Figure 4:
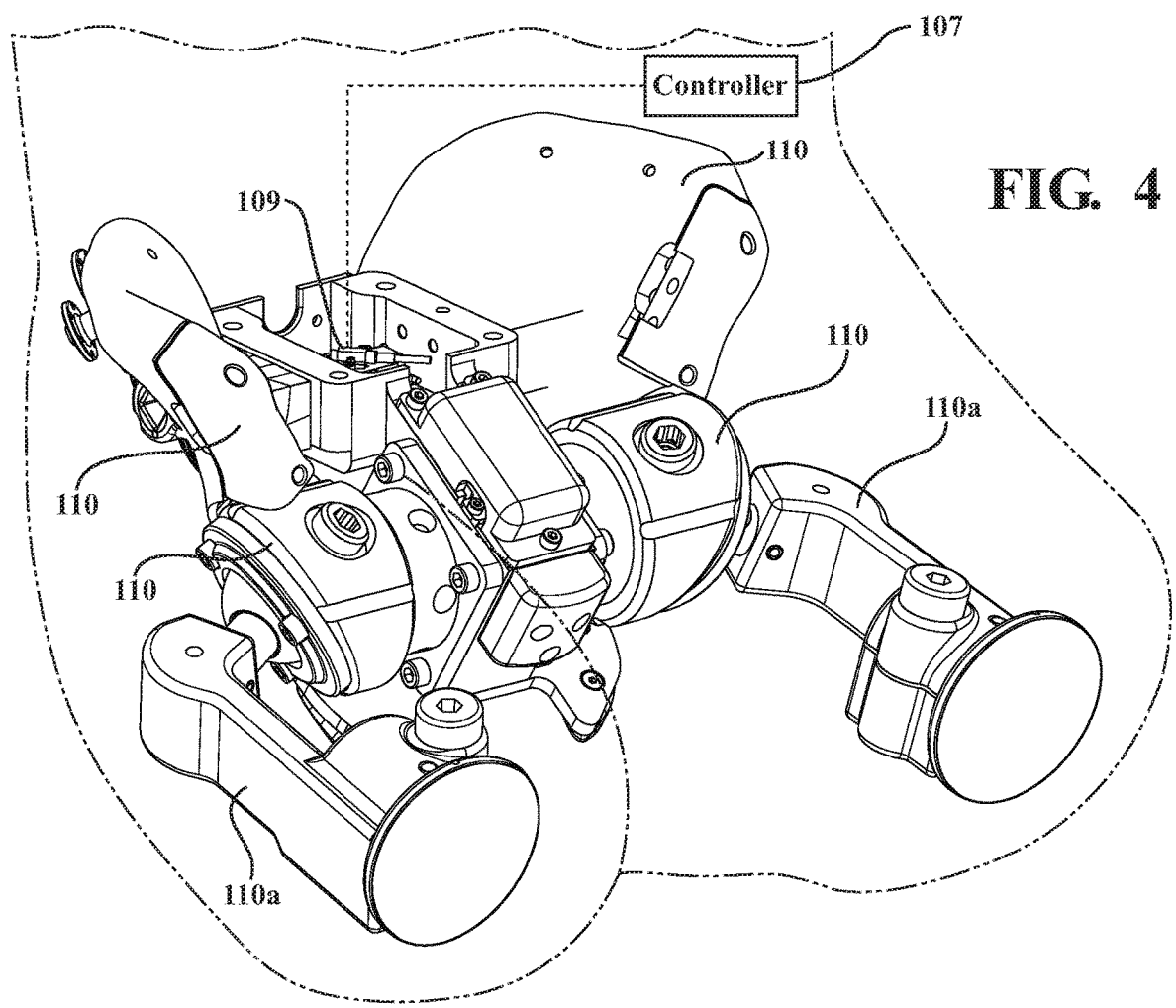
FIG. 4 is an internal perspective view of the support structure contained within the base member of FIG. 3.
Figure 6:
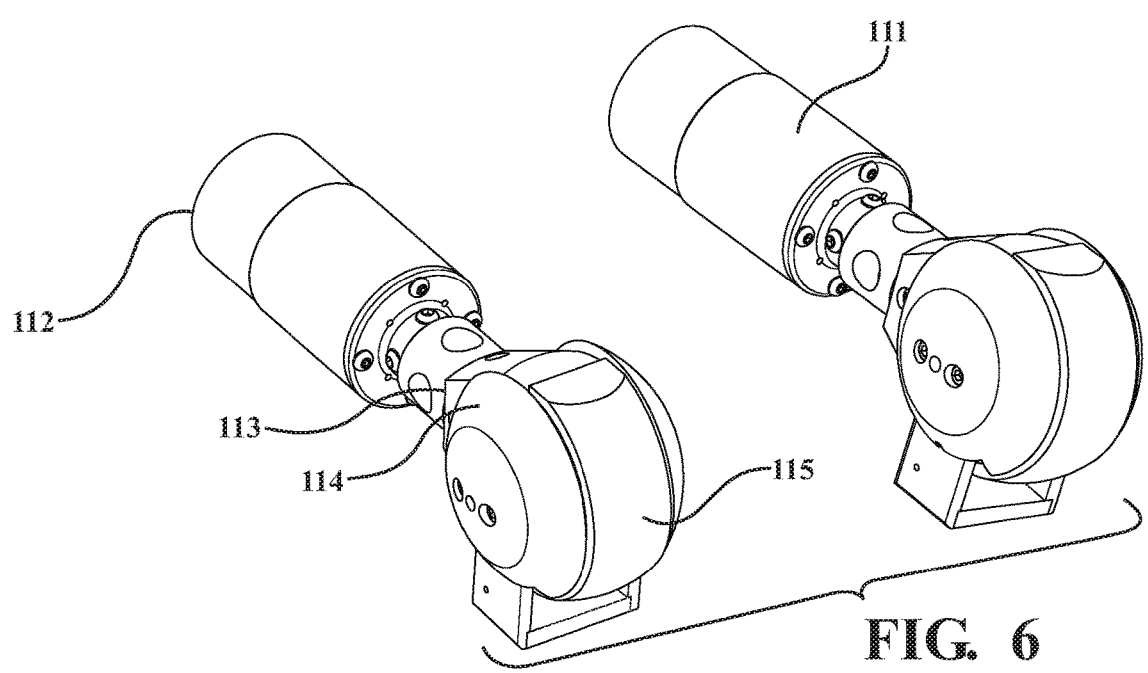
FIG. 6 is an internal perspective view of the support structures contained within the anatomical component of FIG. 5 and including the additional support structure from the other anatomical component from FIG. 2.
Figure 7:
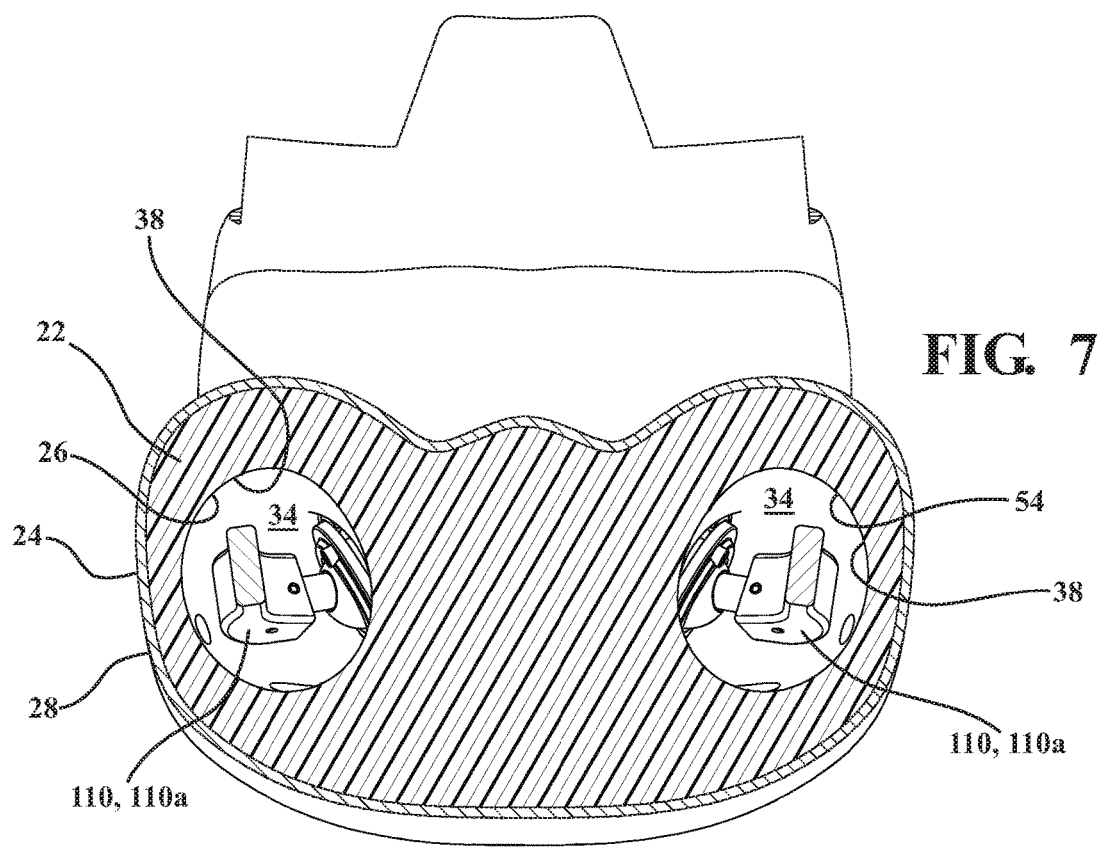
FIG. 7 is a section view of FIG. 3 taken along line 7-7.

As shown in FIGS. 2, 3 and 7, the base member 20 includes an inner core foam 22 covered with a skin 24. The base member 20 includes a base inner surface 26 and an opposing base outer surface 28 and a base peripheral edge 30 connecting the base inner surface 26 to the opposing outer base surface 28.

The base inner surface 26, extending inwardly from the respective edge portions 30, also defines a cavity 34 that accommodates one or more structural members 110 of the crash test dummy 10. These structural members 110 (a series of interconnected structural members 110, which include the specific support structures 110a that extend into the thigh member of the leg assembly 17 are best shown in FIG. 4), in conjunction with the base member 20, aids in providing structural integrity to the crash test dummy 10. In certain embodiments, any one of these structural members 110 may move, or articulate, relative to the base member 20 or relative to an adjacent other one of the structural members 110. Still further, the structural members 110 may be capable of articulating or moving relative to, or in coordination with, other structural members. Even still further, a series of one or more sensors (one exemplary sensor 109 is shown in FIG. 4) may be coupled to the structural members 110, the base member 20, or the anatomical components 60 that sense movement during a crash test simulation. These sensors 109 may also be coupled to a controller (shown as 107 in FIG. 4 and coupled to the sensor 109) that can process the movement of the crash test dummy 10 during a crash simulation. Exemplary sensors may also include load cells or the like.

As best shown in FIG. 3, the base member 20 also includes one or more insertion openings 27, with at least one of the insertion openings 27 designed to receive a respective one anatomical component 60 within the cavity 34. The insertion openings 27 can therefore also be considered as the outer terminus of the cavity 34 of the base member 20.

When the base member 20 is the upper thigh member 20 and wherein the anatomical component 60 is a pair of lower thigh members 60, the upper thigh member 20 includes a pair of insertion openings 27a, 27b (shown in FIG. 3 as first insertion opening 27a and second insertion opening 27b), with each one of the respective insertion openings 27a, 27b that are each respectively configured to receive a respective one of the lower thigh members 60.

The base inner surface 26 may be further subdivided and includes an inner recess surface 36 extending from the base peripheral edge 30 and an inner stepped surface 38 extending from the inner recessed surface 36 in a direction opposite the base peripheral edge 30. A step edge surface 40 extending transverse to each of the inner recessed surface 36 and inner stepped surface 38 connects the inner recess surface 36 to the inner stepped surface 38.

The base member 20 also includes one or more openings 42 extending through the base inner surface 26 and base outer surface 28 that are each respectively configured to receive a fastening member 100 (see FIG. 2) used to secure the base member 20 to a respective one of the lower thigh members 60, as will be explained further below. In particular, the one or more openings 42 are equally spaced around a portion of the base member 20 and extend from the base outer surface 28 to the inner recessed surface 36.

Figure 8:
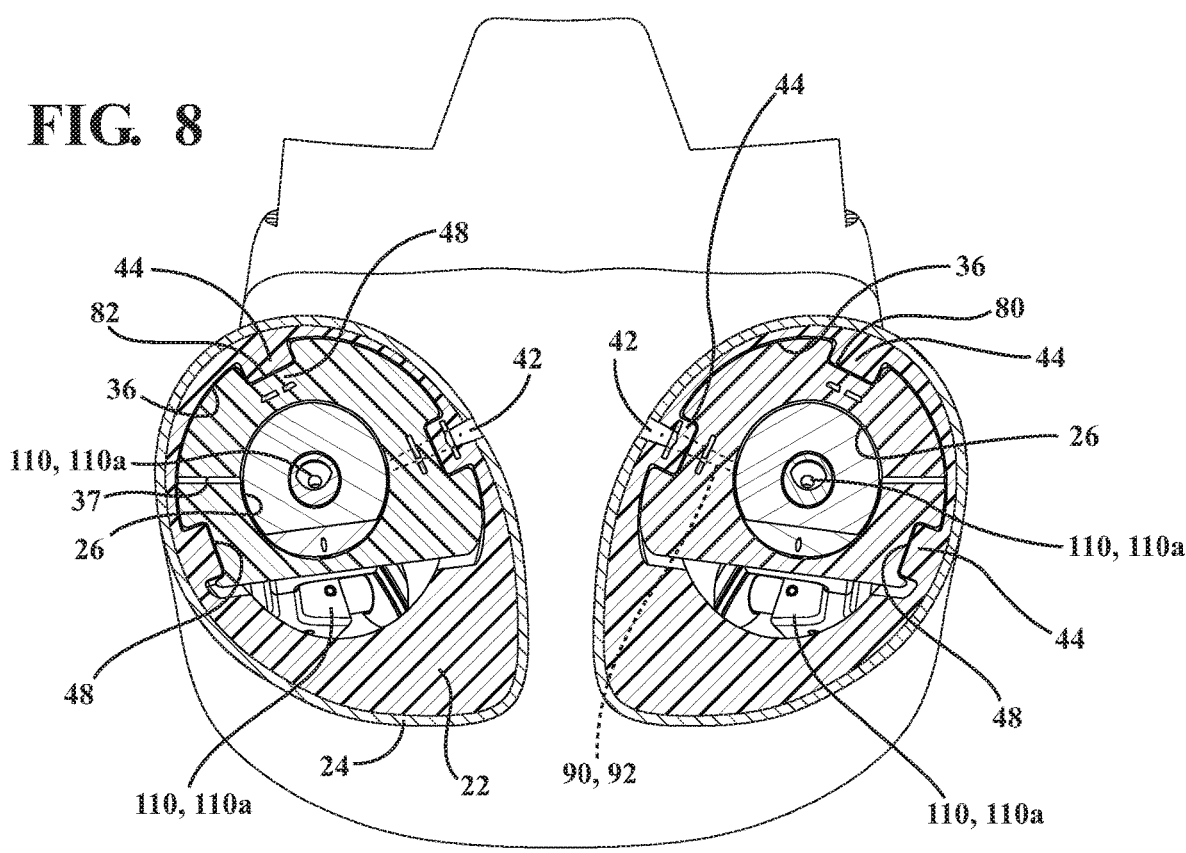
FIG. 8 is another section view of FIG. 3 taken along line 8-8.

At least one base connector 44, shown in the representative embodiment as best shown in FIGS. 2, 3 and 8 as three base connectors 44, may be coupled to, or integrally formed with, the base inner surface 26 of the base member 20. In certain embodiments, the base connectors 44 are locating keys 44, and the locating keys 44 are coupled to, or integrally formed with, the inner recess surface 36 of the base inner surface 26 of the base member 20.

The locating keys 44 preferably are the same size and shape and project inwardly from the inner recess portion 43 within the cavity 34, although in further embodiments not shown the locating keys 44 may have a different size or shape. As best shown in FIGS. 2 and 3, in certain embodiments, the locating keys 44 are block shaped, and include a first pair of opposing spaced apart side surfaces 47 and a second pair of opposing spaced apart side surfaces 49, with each one of the second pair of spaced apart side surfaces 49 extending transverse to and connecting the respective first pair of side surfaces 47. A top surface 48 connects to and extends transverse to each of the first and second pair of side surfaces 47, 49, with the plane defining the top surface 48 extending generally parallel to a plane defining the surface of the inner recess surface 36.

Each of the locating keys 44 can include an opening 46 extending transverse and inward from the top surface 48 towards the inner recess portion. Preferably, the opening 46 in a respective one of the locating keys 44 is aligned with and sized to correspond to a corresponding one of the openings 42 extending from the base outer surface 28 to the inner recessed surface 36 of the base inner surface 26.

As also shown in FIGS. 2 and 3, the top surface 48 of the locating keys 44, an interior surface 52 of the inner recess surface 36 not including the locating keys 44, and an interior surface 54 of the step edge surface 40 may collectively define an interior mating surface 32.

In alternative configurations, the base inner surface 26 includes a stop (not shown), which is similar to and a different form of the step edge surface 40, and the distal end of the component connector 71 abuts the stop when the anatomical component 60 is mounted to the base member 20.

Referring now to FIGS. 2, 5, and 9-12 the anatomical components 60, like the base member 20, includes an inner core foam 62 covered with a skin 64. Also like the base component 20, each of the anatomical components 60 are hollow to allow for the inclusion of an additional structural member 111, or structural members, that function in the same manner as the structural member 110 described above. As will be described further below, the structural member 111 included within the anatomical component 60 has a first end 112 that may be coupled to the structural member 110 in conjunction with the reversible mounting of the anatomical component 60 to the base member 20. The structural component 111 may include an articulating joint 114, shown as part of the knee joint 115 articulating from the second end 113 of the structural member 111 as in FIGS. 2 and 6. Alternatively, the structural component 111 may be coupled to another structural member via an articulating joint in the same or substantially the same manner. Still further, like the structural component 110, a series of one or more sensors may be coupled to the structural members 111, or the anatomical component 60, that sense movement during a crash test simulation. These sensors may also be coupled to a controller 107 that can process the movement of the crash test dummy 10 during a crash simulation.

As best shown in FIGS. 5, and 9-11, the anatomical component 60 includes a component inner surface 66 and an opposing component outer surface 68 and a pair of component peripheral edges 69 connecting the component inner surface 66 to the opposing component outer surface 68. The component inner surface 66 defines a cavity 73 that accommodates the afore-mentioned additional structural member 111.

The crash test dummy 10 also includes a component connector 71 that is coupled to, or otherwise integrally formed with, the anatomical component 60.

Figure 5:
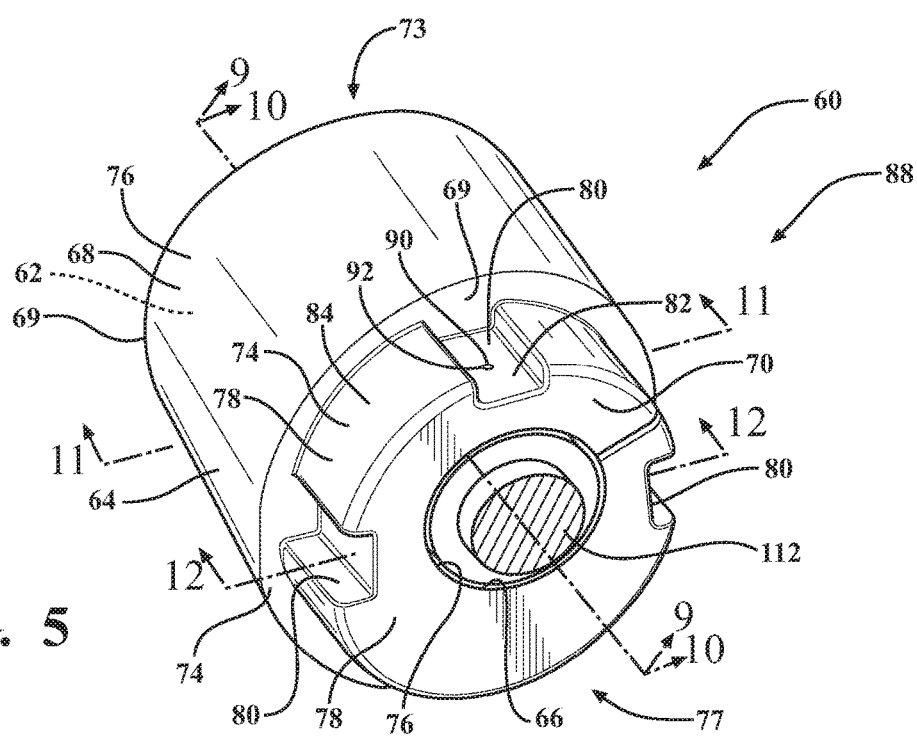
FIG. 5 is a perspective view of one anatomical component of FIGS. 1 and 2.

As best shown in FIGS. 5 and 12, the component connector 71 includes a connector outer surface 74 and an opposing connector inner surface 76 each extending transverse to, and away from one of the component peripheral edges 69. The component connector 71 includes an inner core foam 62a covered with a skin 64a which may define a portion of the inner foam core 62 and skin 64 in embodiments wherein the component connector 71 is integrally formed with the anatomical component 60. The intersection of the connector outer surface 74 and the component peripheral edge 69 is spaced inwardly from the intersection of the component peripheral edge 69 and the component outer surface 68. A connector step edge surface 78 extends transverse to each of the connector outer surface 74 and connector inner surface 76 and connects the connector outer surface 74 to the connector inner surface 76. The connector inner surface 76 also defines a third cavity 77, which is open with (i.e., is in communication with) the second cavity 73. In certain embodiments, the connector inner surface 76 smoothly transitions into the component inner surface 66.

In certain embodiments, such as shown best in FIGS. 2 and 5, the connector outer surface 74 includes at least one slot 80, with each one of the slots 80 configured to be coupled with a corresponding respective one locating key 44 when the base member 20 is coupled to the anatomical member 60. The size and shape of the slots 80 preferably corresponding to the size and the shape of the corresponding respective locating keys 44. The number of the at least one slots 80, and the location of the at least one slots 80 along the connector outer surface 74, also preferably corresponds to the number and location of the at least one locating key 44. Further, the exterior surface 82 of the slots 80, an exterior surface 84 of the outer connector surface 74 not including the slots 80 collectively define an exterior mating surface 88 of the component connector 71.

Still further, as best shown in FIGS. 2, 5, 10 and 12, each one of the slots 80 also includes an opening 90 extending transverse and inward of the exterior surface 82 of the slots 80. A threaded insert 92 is preferably coupled within each one of the respective openings 90. The location of the openings 90 on the respective slots 90 corresponds to, and is aligned with, the corresponding openings 42, 46 when the base member 20 is removably coupled to the anatomical component 60.

As noted above, the crash test dummy 10 also includes at least one fastening member 100 that is used to secure the base member 20 to the respective anatomical component 60 through the aligned openings 42, 46, 90. The number of fastening members 100 corresponds to the number of aligned openings 42, 46, 90. In particular, a respective one of the fastening members 100, preferably a bolt 100 having a threaded end portion 102, is inserted within the aligned openings 42, 46 of the base member 20 and key member 44 and is threadingly engaged with the threaded insert 92 of the aligned opening 90 of the connector component 71, thereby securing the base member 20 to the connector component 71.

The present disclosure is also directed to the associated method for coupling together the base member 20 with one, or both, of the anatomical components 60 that include the component connector 71. As noted above, the base member 20 may be formed by covering the inner core foam 22 with a skin 24 in a desired shape and size and to include the various features as described above. Similarly, the anatomical component 60 and the coupled component connector 71 may be formed by covering the inner core foam 62 with a skin 64 in a desired size and shape and to include the various features as described above. As part of the covering step, the respective foam core portions 22, 62 may be sealingly enclosed with the respective skin 24, 64, or otherwise be retained or secured within the respective skin 24, 64. The methods for forming the respective base member 20 and anatomical portion 60 with the coupled component connector 71 are not limited, and may include any method for forming skin covered foam parts.

The method continues by coupling the at least one base connector 44 to the base inner surface 26. In certain embodiments, the coupling of the at least one base connector 44 includes securing the at least one base connector 44 to the base inner surface 26 using an adhesive, a mechanical fastener such as a staple or thread, or any other known fastening method or technique such that the base connector 44 is secured to the base inner surface 26. Alternatively, the at least one base connector 44 can be integrally formed with the base member 20, and thus the outer surface of the base connector is the skin 24 described above.

In certain embodiments, the method continues by introducing the structural component 110 within the base member 20, and by introducing the structural component 111 within the anatomical component 60 and the coupled component connector 71. In particular, the structural component 110 is introduced within the first cavity 34, while the structural component 111 is introduced within the second cavity 73 of the anatomical member and the third cavity 77 of the component connector 71. The step of introducing the structural components 110, 111 within the base member 20 or anatomical component 60 also specifically includes wherein the base member 20 or anatomical component 60 is wrapped around the structural component 110 after the structural component is assembled, with the base member and anatomical component including respective slits 37, 67 extending through the skin 24, 64 and within the inner foam core 22, 62.

Figure 13:
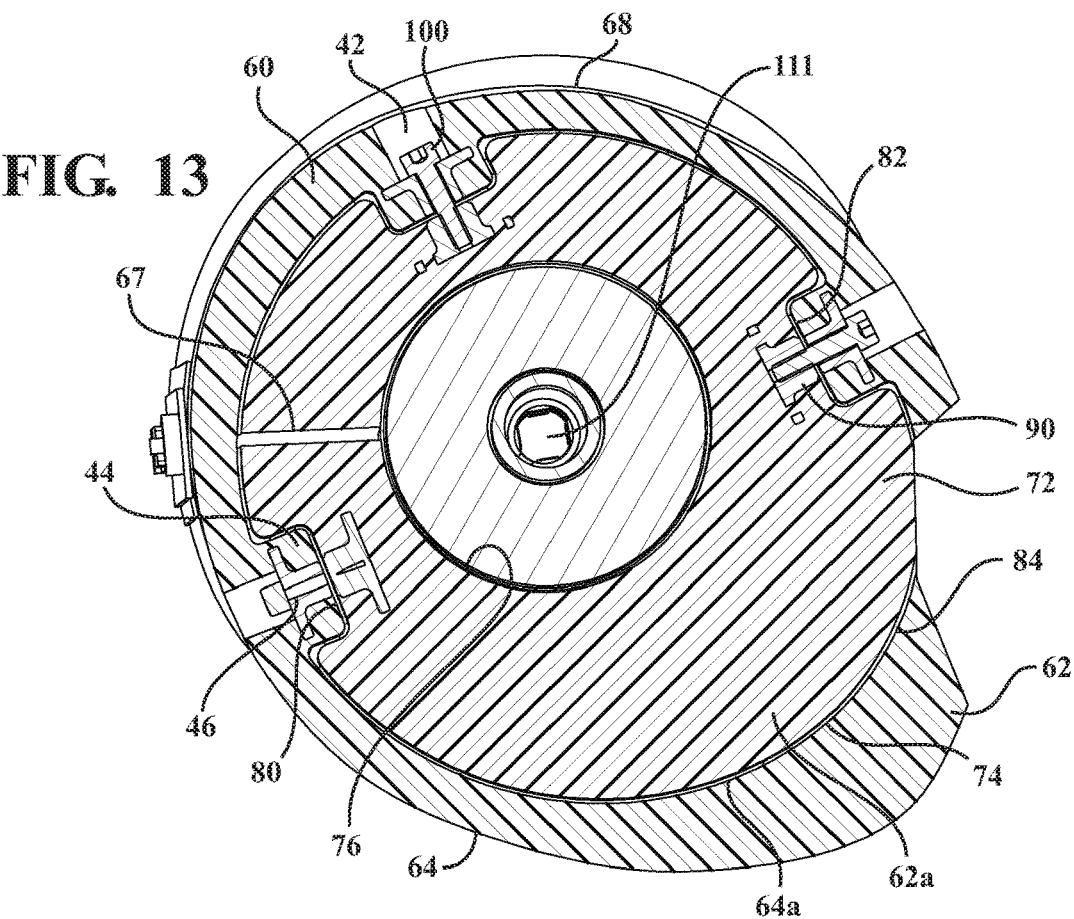
FIG. 13 is a section view of FIG. 2 taken along line 13-13.
Figure 14:
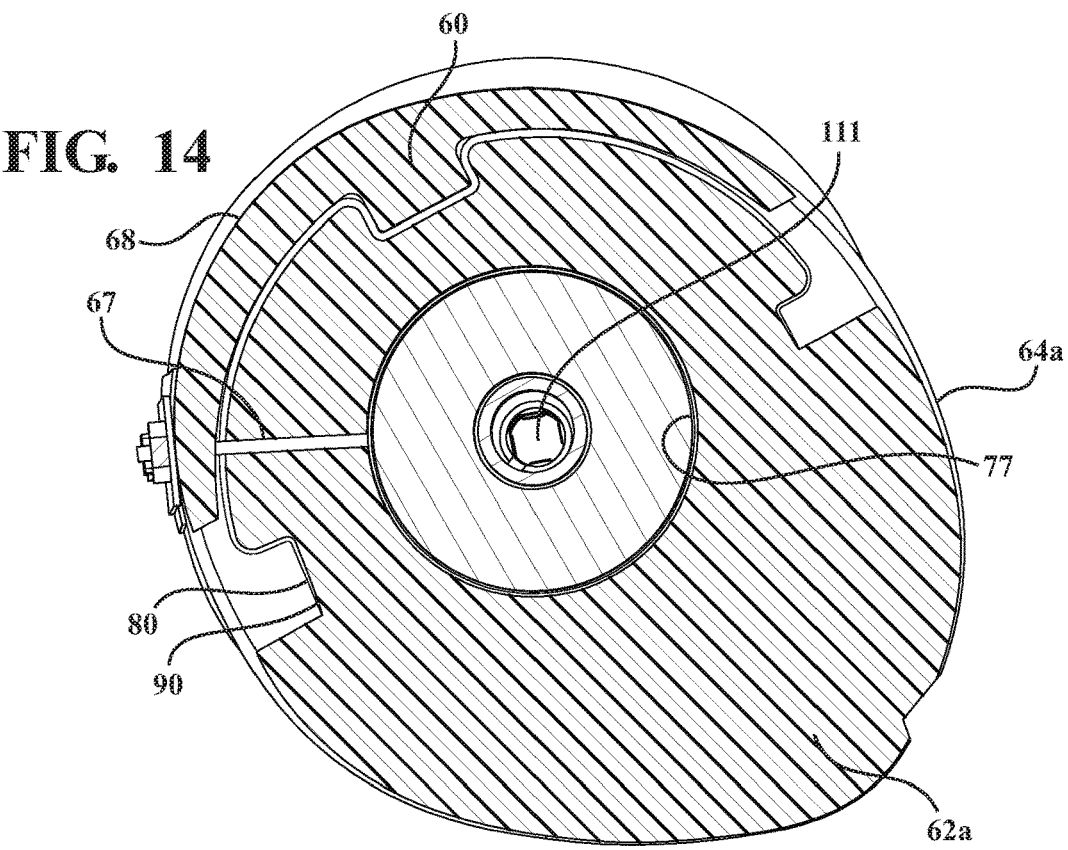
FIG. 14 is another section view of FIG. 2 taken along line 14-14.

The method continues by mounting the anatomical component 60 with the coupled component connector 71 to the base member 20 such that the base peripheral edge 30 abuts the component peripheral edge surface 69 with the base and component outer surfaces 28, 68 aligning to define a smooth transition between the base outer surface 28 and the component outer surface 68 and such that the component connector 71 is at least partially disposed within the first cavity 34 and engages the base connector 44. The coupling is illustrated in FIGS. 2, 13 and 14.

In particular, this step may include inserting the component connector 71 within the insertion opening 27, 27a, 27b of the base member 20 such that the component connector 71 is at least partially contained within the first cavity 34 and such that the peripheral edge surfaces 30, 70 of the base member 20 and connector component 71 abut. In this position, the outer surfaces 28, 68 of the base and anatomical components 20, 60 are aligned to provide a smooth transition between the outer surfaces 28, 68. Still further, in this position in certain embodiments, each one of the base connectors 44 are aligned with, and coupled to, or otherwise engaged with the component connector 71. In certain embodiments, this engagement prevents rotation of the base member 20 relative to the mounted anatomical component 60.

In alternative configurations, wherein the base inner surface 26 includes a stop (not shown), and the method of this step includes the step wherein said component connector 71 extends outwardly from said component peripheral edge 70 to a distal end with the distal end abutting the stop when the anatomical component 60 is mounted to the base member 20.

As a part of the mounting step, the method may also include the step of coupling the structural member 110 contained within the cavity 34 of the base member 20 to the structural member 111 contained within the cavities 73, 77 of the anatomical member 60 and coupled component connector 71, wherein the cavities 34, 73, and 77 are all aligned and in communication (i.e., open) with one another. The coupling could be further defined as securing or otherwise fastening the structural member 110 to the structural member 111.

The method continues and includes the further step of securing the base member 20 to the anatomical component 60 using at least one fastener members 100.

In certain embodiments, as shown for example in FIG. 2, a fastening member 100 is inserted through the aligned openings 42, 46 and is threadingly engaged to the threaded inserts 92 coupled within the further aligned opening 90. The process is repeated such that additional fastening members 100 are inserted through additional respective aligned openings 42, 46 and are respectively threadingly engaged to the threaded inserts 92 coupled within the further aligned respective opening 90. As such, the base member 20 is secured to the respective component connector 71.

The same method, as described above, can be used to secure the base member 20 to the respective second one of the anatomical components 60 and coupled component connector 71 inserted within the second insertion opening 27b.

In an alternative equivalent embodiment, the structure of the base member 20 and the corresponding structure the anatomical component 60 could be reversed. In particular, the base member 20 could include the afore-mentioned inwardly stepped portion and connector coupling members, and the anatomical component 60 could include the afore-mentioned inner recessed portion and connector members, and the base member 20 could be inserted within the insertion openings and be partially contained with the cavity of the connected portion, with the fastening members inserted through the aligned openings and threaded inserts, in the manner similar to the manner described above with respect to the embodiment illustrated in FIGS. 1-14.

The present disclosure also describes a system 1000 for creating a virtual anthropomorphic test device and evaluating the created virtual anthropomorphic test device in a virtual crash test using a software application included on a computer. The anthropomorphic test device is a virtual representation of the anthropomorphic test device described above, including all of the features and components as described above.

Figure 15:
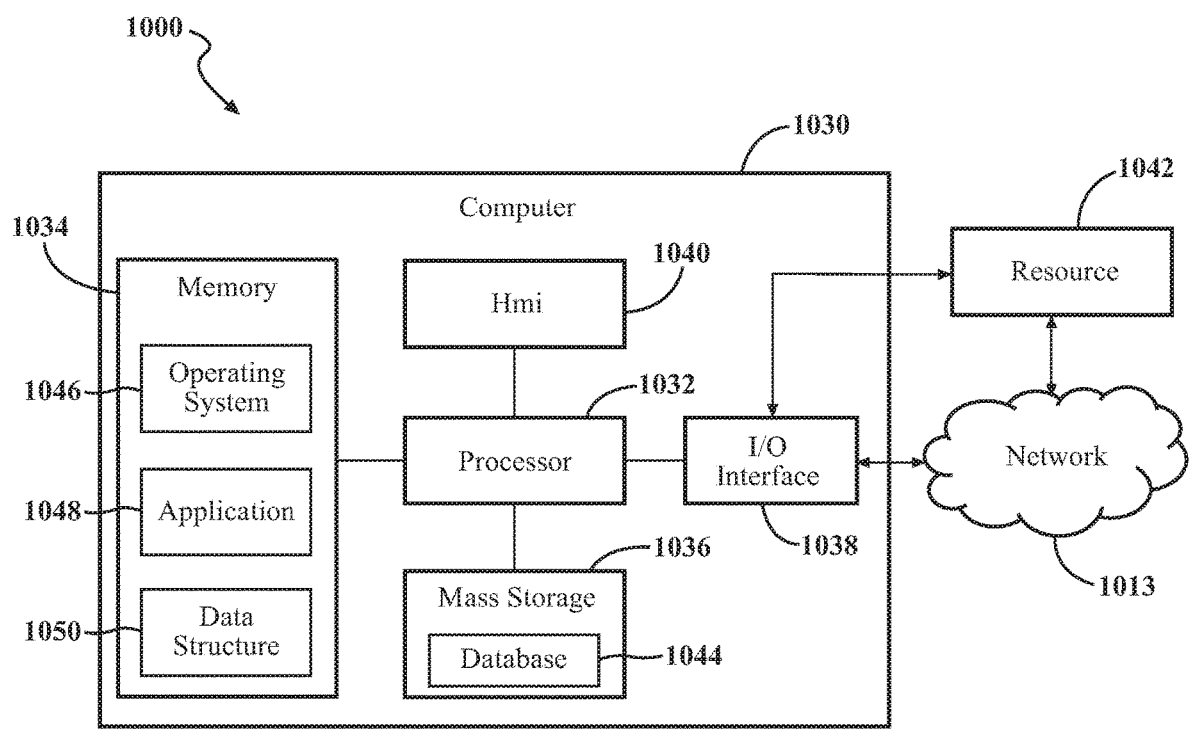
FIG. 15 is a schematic view of a system for creating and evaluating a virtual anthropomorphic test device.

Referring now to FIG. 15, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 1044 may reside on the mass storage memory device 1036, and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 10' and software applications that evaluate the created virtual anthropomorphic test device 10' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

The present disclosure addresses and overcomes the separation issues associated with the prior art coupling designs and provides therefore a crash test dummy having a more human-like response, during collision testing. By virtue of the coupling together the base member and anatomical component, the coupled base member and anatomical component do not separate by being offset to one another, or rotated with respect to one another, during crash testing as has occurred in prior art designs. In embodiments wherein the base and anatomical components are upper thigh and lower thigh members, the coupled upper and lower thigh member do not separate by being offset to one another, or rotated with respect to one another, during crash testing as has occurred in prior art designs in which the upper thigh member and the lower thigh member of the leg assembly of the device are connected together through a joint and include the thigh flesh that is segmented at a position corresponding to this joint. The associated system allows virtual crash test simulations to be run to confirm that the crash test dummies 10 disclosed herein addresses and overcomes the separation issues.

The present disclosure has been described in an illustrative manner. It is to be understood that the terminology, which has been used, is intended to be in the nature of words of description rather than of limitation.

Many modifications and variations of the present disclosure are possible in light of the above teachings. Therefore, the present disclosure may be practiced other than as specifically described.

What is claimed is:
1. An anthropomorphic test device comprising:
    a base member having a base inner surface and an opposing base outer surface and a base peripheral edge connecting said base inner surface to said base outer surface with said base inner surface defining a first cavity;

at least one base connector coupled to said base inner surface and at least partially disposed within said first cavity;

an anatomical component mounted to said base member, said anatomical component having a component inner surface and an opposing component outer surface and a component peripheral edge connecting said component inner surface to said component outer surface, with said component inner surface defining a second cavity; and at least one component connector coupled to said anatomical component;

wherein said component connector engages said base connector such that said base and component outer surfaces are aligned and wherein the engagement of said component connector to said base member prevents rotation of said base member relative to said anatomical component when said anatomical component is mounted to said base member.

2. The test device of claim 1, wherein said at least one base connecter is integrally formed with said base inner surface.

3. The test device of claim 1, wherein said at least one base connector comprises at least one locating key and wherein said component connector includes at least one slot, and wherein a respective one key is coupled within a corresponding respective one slot when said anatomical component is mounted to said base member.

4. The test device of claim 3, wherein each one of said at least one locating key is integrally formed with said base inner surface.

5. The test device of claim 1 further comprising:

a first structural member disposed within said first cavity of said base member; and a second structural member disposed within said second cavity of said anatomical component with said second structural member having a first end and an opposing second end, wherein said first end of said second structural member is coupled to said first structural member when said anatomical component is mounted to said base member.

6. The test device of claim 5, wherein said second end of said second structural member has an articulating joint.

7. The test device of claim 1 further comprising a fastener extending through said base and component connectors to secure said base member to said component connector.

8. The test device of claim 1, wherein said base inner surface includes a stop;

and wherein said component connector extends outwardly from said component peripheral edge to a distal end with said distal end abutting said stop when said anatomical component is mounted to said base member.

9. The test device of claim 1, wherein said component connector has a connector inner surface defining a third cavity with said second and third cavities in communication with each other.

10. The test device of claim 9, wherein said third cavity is in communication with said first cavity when said anatomical component is mounted to said base member.

11. The test device of claim 10, wherein said connector inner surface aligns with said base inner surface to define a smooth transition between said connector inner surface and said base inner surface when said anatomical component is mounted to said base member.

12. The test device of claim 11 further comprising:

a first structural member at least partially disposed within said first cavity of said base member; and a second structural member at least partially disposed within said second cavity of said anatomical component and said third cavity of said connector component with said second structural member having a first end and an opposing second end, wherein said first end of said second structural member is coupled to said first structural member when said anatomical component is mounted to said base member.

13. The test device of claim 1, wherein each of said base member and said anatomical component includes an inner core foam covered with a skin.

14. The test device of claim 1, wherein said base member comprises one of an upper thigh member and a lower thigh member and said anatomical component comprises an other one of said upper thigh member and said lower thigh member.

15. A method of forming an anthropomorphic test device having a base member defining a first cavity and an anatomical component defining a second cavity, said method comprising the steps of:

coupling at least one base connector to a base inner surface of the base member with the at least one base connecter being disposed within the first cavity;

coupling at least one component connector to the anatomical component;

disposing a first structural component within the first cavity of the base member;

disposing a second structural component within the second cavity of the anatomical component; and mounting the anatomical component to the base member such that the base and component outer surfaces are aligned and such that the component connector engages the base connector and wherein the engagement of the component connector to the base connector prevents rotation of the base member relative to the anatomical component.

16. The method of claim 15 wherein said step of mounting the anatomical component to the base member further comprises coupling the first structural component to the second structural component.

17. The method of claim 15, wherein the at least one base connector comprises at least one locating key coupled to the base inner surface and wherein the at least one component connector includes at least one slot, and wherein a respective one key is coupled within a corresponding respective one slot when the anatomical component is mounted to the base member.

18. A system comprising:

a computer including at least one processor, said processor including a memory;

a first software application stored on said memory configured to create a virtual anthropomorphic test device, said virtual anthropomorphic test device comprising:

a virtual base member having a base inner surface and an opposing base outer surface and a base peripheral edge connecting said base inner surface to said base outer surface with said base inner surface defining a first cavity;

at least one virtual base connector coupled to said base inner surface and at least partially disposed within said first cavity;

a virtual anatomical component mounted to said virtual base member, said virtual anatomical component having a component inner surface and an opposing component outer surface and a component peripheral edge connecting said component inner surface to said component outer surface, with said component inner surface defining a second cavity; and at least one virtual component connector coupled to said virtual anatomical component;

wherein said virtual component connector engages said virtual base connector such that said virtual component connector said base and component outer surfaces are aligned and wherein the engagement of said virtual component connector to said virtual base connector prevents rotation of said virtual base member relative to said virtual anatomical component when said virtual anatomical component is mounted to said virtual base member.

19. The system of claim 18 wherein the software application is further configured to implement a virtual collision simulation on said created virtual anthropomorphic test device.

* * * * *